(12) United States Patent
Hasegawa

(10) Patent No.: US 6,996,606 B2
(45) Date of Patent: Feb. 7, 2006

(54) JUNK MAIL REJECTION SYSTEM

(75) Inventor: Masakazu Hasegawa, Tokyo (JP)

(73) Assignee: Nihon Digital Co., Ltd., Tokyo (JP)

( * ) Notice: Subject to any disclaimer, the term of this patent is extended or adjusted under 35 U.S.C. 154(b) by 641 days.

(21) Appl. No.: 10/259,496

(22) Filed: Sep. 30, 2002

(65) Prior Publication Data
US 2003/0069935 A1 Apr. 10, 2003

(30) Foreign Application Priority Data
Oct. 5, 2001 (JP) ............................. 2001-310115

(51) Int. Cl.
G06F 13/00 (2006.01)

(52) U.S. Cl. ....................... 709/206; 709/203; 709/217
(58) Field of Classification Search ........ 709/200–203, 709/206, 217, 218–220, 227
See application file for complete search history.

(56) References Cited

U.S. PATENT DOCUMENTS

| 5,619,648 | A | * | 4/1997 | Canale et al. | 709/206 |
| 6,112,227 | A | * | 8/2000 | Heiner | 709/203 |
| 6,167,434 | A | * | 12/2000 | Pang | 709/206 |
| 6,321,267 | B1 | * | 11/2001 | Donaldson | 709/229 |
| 6,453,327 | B1 | * | 9/2002 | Nielsen | 715/500 |
| 6,484,197 | B1 | * | 11/2002 | Donohue | 709/206 |
| 6,493,007 | B1 | * | 12/2002 | Pang | 715/835 |
| 6,643,687 | B1 | * | 11/2003 | Dickie et al. | 709/206 |
| 6,708,205 | B2 | * | 3/2004 | Sheldon et al. | 709/206 |
| 6,868,436 | B1 | * | 3/2005 | Fleming, III | 709/206 |
| 6,868,498 | B1 | * | 3/2005 | Katsikas | 713/201 |

FOREIGN PATENT DOCUMENTS

| EP | 0 813 162 A2 | 12/1997 |
| GB | 2 347 053 A | 8/2000 |
| JP | 2000-163341 | 6/2000 |

OTHER PUBLICATIONS

United Kingdom Search Report dated Mar. 17, 2003.
Japanese Office Action dated May 10, 2005.
Tategami Tatsuhiko, et al., "Use technique for Cellular phone (i-mode) + personal computer", Feature 1 All of mail forwarding, Aug. 28, 2000, ai-shuppan co., ltd.

* cited by examiner

Primary Examiner—Moustafa M. Meky
(74) Attorney, Agent, or Firm—McGinn IP Law Group, PLLC

(57) ABSTRACT

To provide a junk mail rejection system which can effectively reject junk mail in electronic mail. When junk mail transmitted from many and unspecified persons is sent to a first electronic mail address registered in a first mail distribution service center, sources of the junk mail are not acceptable electronic mail addresses, and a reception enable unit rejects receiving the junk mail, thereby avoiding transmission of the junk mail to subscribers. On the other hand, the electronic mail transmitted from many and unspecified persons and not to be rejected by the reception enable unit is transmitted to a second electronic mail address. The electronic mail to the second electronic mail address received by a second mail distribution service center is forwarded to a third mail distribution service center, and a replacement unit replaces a source with an acceptable electronic mail address registered in the first mail distribution service center, and the electronic mail is transmitted to the first mail distribution service center. Since the source is set to an acceptable electronic mail address, the reception enable unit in the first mail distribution service center enables reception, and a subscriber can receive the electronic mail.

18 Claims, 15 Drawing Sheets

FIG.13

| IDENTIFICATION CODE DASP LIST | | |
|---|---|---|
| da00 | OWN ATTRIBUTE | FEMALE, FROM KANAGAWA PREF., 36 YEARS OLD, LIKES READING BOOKS |
| | | ALL MAIL CAN BE RECEIVED |
| das4 | OWN ATTRIBUTE | FEMALE, FROM KANAGAWA PREF., 36 YEARS OLD, LIKES READING BOOKS |
| | REQUEST TO TRANSMITTER | MALE, PERSONAL |
| dbs5 | OWN ATTRIBUTE | FEMALE, FROM AKITA PREF., BORN IN DEC., LIKES TRAVELING |
| | REQUEST TO TRANSMITTER | CORPORATION, LOCATED IN AOMORI, AGRICULTURE, RECRUIT |
| dcs6 | OWN ATTRIBUTE | MALE, LIKE TRAVELING |
| | REQUEST TO TRANSMITTER | CORPORATION, TYPE OF BUSINESS/SALES, BAGS |
| xxzz | OWN ATTRIBUTE | ..... |
| | REQUEST TO TRANSMITTER | ALL MAIL IS TO BE REJECTED |

FIG.14

| SIMPLE CODE | SUB-SCRIBER | TRANSMITTER | NUMBER OF REGISTRANTS | EXAMPLE OF USE |
|---|---|---|---|---|
| 1 | HOUSE WIFE | SUPERMARKET | 2,000,000 | REDUCTION INFORMATION ABOUT FRESH FOOD FOR HOUSEWIVES IN VICINITY |
| | | | | RECRUITING PART-TIME WORKERS |
| ⋮ | ... | ... | ... | ......... |
| 10 | STUDENT | EDUCATIONAL INDUSTRY | 4,000,000 | SEMINAR INFORMATION MAIL FOR LOCAL STUDENTS |

FIG.16

| RECEIVER ||
|---|---|
| RANK | HANDLE |
| PLATINUM | MR. A, MR. B |
| GOLD | MR. N, MR. M |
| SILVER | MR. X, MR. Y |
| METAL | ... |

JUNK MAIL REJECTION SYSTEM

BACKGROUND OF THE INVENTION

1. Field of the Invention

The present invention relates to a junk mail rejection system for rejecting junk mail in electronic mail.

2. Description of the Related Art

Recently, as various networks such as Internet, etc. have been developed and wireless terminal equipment has made remarkable progress, more and more information has been transmitted and received by electronic mail, and a number of users utilize electronic mail personally and for business.

On the other hand, with an increasing utilization factor of electronic mail, there arises the social problem that the amount of electronic mail from an undesired source, that is, junk mail, has largely increased. Now, an Internet service system using a wireless telephone as an example is explained. There is a center capable of gaining access through a network such as Internet, etc., and an electronic mail address is assigned to a wireless telephone of a subscriber. When electronic mail is transmitted to the electronic mail address of a subscriber, the information about the electronic mail is transmitted from the center to the wireless telephone of the subscriber if the electronic mail is transmitted through the center and the wireless telephone of the corresponding subscriber is set ON. If the electronic mail address of the subscriber is correctly specified as a destination, then electronic mail is received by the wireless telephone regardless of the intention of the subscriber to receive the mail, thereby generating junk mail. Especially when the service fee is charged to a receiving subscriber depending on the amount of information received by the subscriber from the center in the system of the Internet service, the total amount of payment of the subscriber who receives junk mail increases due to the junk mail, thereby causing the subscriber to suffer a loss. One of the solving methods is to change the system into a system in which a fee is charged to a transmitter's account, or into a system in which for each piece of electronic mail, a subscriber can select whether or not the electronic mail is to be received. However, it means to largely change an entire system, and requires a high cost. Other than changing the system, there is a method of avoiding a charge to a receiver when the amount of information is equal to or smaller than a predetermined amount. However, this method cannot completely avoid a loss by junk mail having a large amount of information. Furthermore, there can also be a method of changing the electronic mail address of a subscriber, but changing an electronic mail address requires notifying all possible transmitters of desired electronic mail of the change of the electronic mail address, thereby imposing a heavy load on the subscriber. Otherwise, there can be an existing system in which a center includes means for performing capabilities of: 'specified reception' for receiving only mail whose source is specified source electronic mail address; 'specified rejection' for rejecting only mail whose source is specified source electronic mail address; 'batch rejection' for rejecting reception of all electronic mail, etc. However, the 'specified reception' is restricted in the number of electronic mail addresses to be specified, and electronic mail to be received cannot be received if it is not specified. Similarly, since reception of all electronic mail is rejected in the 'batch rejection', electronic mail to be received cannot be received. Additionally, since a source electronic mail address of junk mail can be constantly changed, the junk mail cannot be effectively avoided in the 'specified rejection'.

Another problem with the junk mail is that old necessary electronic mail is removed by a large amount of junk mail received when there is a restriction in the number of pieces of electronic mail to be stored for each subscriber and the predetermined number of pieces of later electronic mail is stored.

Furthermore, malicious electronic mail can be acts of terrorism of damaging the function of mail at the destination by intentionally concentrating a large amount of junk mail. The acts of terrorism not only aims at a person but also aims at an organization such as a large company, government and municipal offices, etc. whose domain names are often published, and the user name in the electronic mail address of each member can be simply the name of the member and the pattern of the address is simple. Therefore, a terrorist can easily transmit electronic mail to the electronic mail address of a member of an organization. Furthermore, if each member suffers the acts of terrorism when the electronic mail received by a server of the organization is set to be transferred to his or her own wireless telephone, then old but necessary electronic mail are all cleared as described above. Additionally, it requires a cost of using a telephone line to delete a large amount of unnecessary mail, thereby badly damaging the subscriber.

Whereas junk mail causes the above mentioned damage, some electronic mail belonging to normal junk mail to be transmitted at random to a number of general subscribers does not function as junk mail depending on the type of receiving subscriber. That is, although electronic mail functions as junk mail for some subscribers, it is not junk mail if the contents of the mail are desired by other subscribers. Namely, such mail has a possibility of creating an mail distribution industry more effective than conventional direct mail distributed by conventional mail.

SUMMARY OF THE INVENTION

In view of the foregoing and other drawbacks, disadvantages and problems of the conventional methods and structures, the first object of the present invention is to provide a junk mail rejection system capable of effectively preventing junk mail.

The second object of the present invention is to provide a junk mail rejection system capable of preventing the damage by junk mail transmitted with a view to acts of terrorism.

The third object of the present invention is to provide a junk mail rejection system in which electronic mail from any source not transmitting junk mail depending on the subscriber is reception enabled.

To attain the above mentioned object, the junk mail rejection system according to the present invention includes:

a first mail distribution service center having a database in which a first electronic mail address of a subscriber is registered, receiving electronic mail transmitted to the first electronic mail address through a cable/wireless network, and transmitting the electronic mail to a terminal of the subscriber;

a second mail distribution service center having a database in which a second electronic mail address of the subscriber is registered, and receiving electronic mail to the second electronic mail address through a cable/wireless network; and a third mail distribution service center having a database in which a third electronic mail address of the subscriber is registered, and receiving electronic mail to the third electronic mail address through a cable/wireless network, wherein the first mail distribution service center registers in the database one or more source electronic mail addresses as acceptable electronic mail addresses, associated with the first electronic mail address, from which electronic mail can be transmitted to the terminal of a subscriber among source electronic mail addresses of electronic mail addressed to the first electronic mail address, and includes: reception means for receiving electronic mail to the first electronic mail address; reception enable means for determining whether or not a source electronic mail address of electronic mail received by the reception means is an acceptable electronic mail address registered in the database; and distribution means for transmitting the electronic mail to a terminal of a subscriber only the case when the reception enable means determines that it is an acceptable electronic mail address;

the second mail distribution service center registers an electronic mail address of a transfer destination of a subscriber with the database associated with a second electronic mail address, and includes reception means for receiving electronic mail to the second electronic mail address; and transfer means for forwarding the electronic mail received by the reception means to a third mail distribution service center directly through a cable/wireless network, or through another center; and the third mail distribution service center registers an electronic mail address of a transfer destination of a subscriber with the database associated with a third electronic mail address, and comprises reception means for receiving electronic mail to the third electronic mail address; replacement means for replacing a source electronic mail address of the electronic mail received by said reception means with one of the acceptable electronic mail addresses; and transfer means for forwarding the electronic mail whose source electronic mail address has been replaced by said replacement means to said first mail distribution service center directly through a cable/wireless network, or through another center.

To attain the above mentioned object, an intermediate mail distribution service center according to the present invention is provided between a first mail distribution service center having a database in which a first electronic mail address of a subscriber is registered, receiving electronic mail transmitted to the first electronic mail address through a cable/wireless network, and transmitting the electronic mail to a terminal of the subscriber only when a source of the electronic mail has an acceptable electronic mail address permitted in advance for transmission to a terminal of the subscriber and a second mail distribution service center having a database in which a second electronic mail address of the subscriber is registered, and receiving electronic mail to the second electronic mail address through a cable/wireless network, and includes:

reception means for receiving electronic mail to a second electronic mail address received by the second mail distribution service center;

replacement means for replacing a source of the electronic mail received by said reception means with the acceptable electronic mail address determined by the first mail distribution service center; and transfer means for allowing the electronic mail replaced by the replacement means to be transmitted to the first mail distribution service center.

The second electronic mail address can be registered as one of the acceptable electronic mail addresses registered in the database of the first mail distribution service center, and the replacement means of the third mail distribution service center replaces a source electronic mail address with the second electronic mail address.

The replacement means can replace destination data of the electronic mail received by the reception means with the source data, and replace the source data with the destination data.

The replacement means can add the source data and/or destination data before replacement to the information of a body of electronic mail.

The third mail distribution service center can further include mail reception amount restriction means for determining whether or not the electronic mail received in a predetermined time period has exceeded a predetermined amount, and the electronic mail is rejected when the electronic mail has exceeded the predetermined amount.

The third mail distribution service center can have a database storing for each subscriber an identification code indicating an attribute of a subscriber and an attribute of a transmitter whose electronic mail is permitted by the subscriber, and direct electronic mail transmission means for transmitting electronic mail to a specified mail address of a subscriber selected by the identification code.

The direct electronic mail transmission means can transmit electronic mail selected at random or intentionally as premier mail.

The third mail distribution service center can have a receiver rank database storing the number of pieces of obtained premier mail for each subscriber, and allows the contents of the receiver rank database to be viewed on WEB as is or after being processed.

The third mail distribution service center can have a transmitter rank database storing the number of votes of subscribers who evaluate a transmitter for each transmitter of electronic mail transmitted by the direct electronic mail transmission means, and allows the contents of the transmitter rank database to be viewed on WEB as is or after being processed.

When junk mail transmitted from many and unspecified persons is sent to a first electronic mail address registered in the first mail distribution service center, since the sources of the junk mail are not acceptable electronic mail addresses, the reception enable means rejects receiving the junk mail, thereby avoiding transmission of the junk mail to subscribers. On the other hand, the electronic mail transmitted from many and unspecified persons and not to be rejected by the reception enable means is transmitted to a second electronic mail address. The electronic mail to the second electronic mail address received by the second mail distribution service center is transferred to the third mail distribution service center (intermediate mail distribution service center), and the replacement means replaces the source with the acceptable electronic mail address registered in the first mail distribution service center, and the electronic mail is transmitted to the first mail distribution service center. Since the replaced source is set to an acceptable electronic mail address, the reception enable means in the first mail distribution service center enables reception, and a subscriber can receive the electronic mail.

Thus, the subscriber certainly receives the electronic mail whose source electronic mail address is not registered as acceptable electronic mail address, but which should be received by the subscriber when the electronic mail is transmitted from the source electronic mail address, thereby removing only junk mail. When the second mail distribution service center is a target of junk mail, the subscriber receives the junk mail through the first mail distribution service center. In this case, the risk of receiving junk mail can be shared between the first mail distribution service center and the second mail distribution service center, and the problem that only the first mail distribution service center receives the damage of receiving the junk mail can be avoided. Furthermore, when the first electronic mail address is changed, it is not necessary to notify all related subscribers of the changed electronic mail address, but it is necessary only to notify the third mail distribution service center (intermediate mail distribution service center) of the change.

Additionally, the electronic mail to the second electronic mail address of the second mail distribution service center includes the information about the second electronic mail address as a destination. Therefore, if the replacement means of the third mail distribution service center sets the source as the second electronic mail address, then the electronic mail to the second electronic mail address of the second mail distribution service center can be received through the first mail distribution service center by setting the second electronic mail address as an acceptable electronic mail address.

Furthermore, by setting the source data as the destination data, the original source data contained in the original electronic mail can be reserved, thereby allowing the receiving subscriber to know who is the transmitter.

In addition, by adding the destination data and the source data before replacement to the information of the body of electronic mail, the subscriber can certainly grasp them from the body of the electronic mail.

Also by means of mail reception amount restriction means, acts of terrorism can be avoided.

Furthermore, subscribers can register in advance identification codes indicating the attributes of sources, the electronic mail from which can be allowable for the subscribers to be received. In the case, the electronic mail from the source belonging to the identification codes that the subscribers registered in advance is transmitted to the subscribers by the direct electronic mail transmission means. Thus, corresponding traders belonging to the registered identification code can transmit direct electronic mail to the subscriber who registered the identification code, thereby utilizing the mail as effective marketing means. Furthermore, since an identification code also indicates the attribute of a subscriber, a transmitter who transmits direct electronic mail can effectively transmit electronic mail.

Including premier mail in the direct electronic mail urges a subscriber to receive the largest possible amount of direct electronic mail, thereby successfully transmitting more direct electronic mail to a larger number of subscribers.

Additionally, ranking subscribers based on the amount of obtaining premier mail and publishing the ranking result urges the subscribers to receive a larger amount of direct electronic mail with a view to obtaining premier mail. As a result, the third mail distribution service center (intermediate mail distribution service center) is used more frequently.

By a receiver voting for a transmitter who asks the third mail distribution service center to transmit direct mail, the transmitter is urged to endeavor to be liked by the receiver, and obtain a larger number of votes. Thus, a more effective advertisement is planned, and the third mail distribution service center (intermediate mail distribution service center) is used more frequently.

The present disclosure relates to subject matter contained in Japanese Patent Application Nos. 2001-310115, filed on Oct. 5, 2001, which are expressly incorporated herein by reference in its entirety.

BRIEF DESCRIPTION OF THE DRAWINGS

The foregoing and other purposes, aspects and advantages will be better understood from the following detailed description of preferred embodiments of the invention with reference to the drawings, in which:

FIG. 13 shows an example of a list of identification codes stored in the identification code listing database;

FIG. 14 shows an example of displaying a list of published identification codes;

FIG. 16 shows examples of receivers of higher ranks.

DETAILED DESCRIPTION OF THE PREFERRED EMBODIMENTS

The embodiments of the present invention are explained below by referring to the attached drawings.

(Rejecting Junk Mail)

Figure 1:
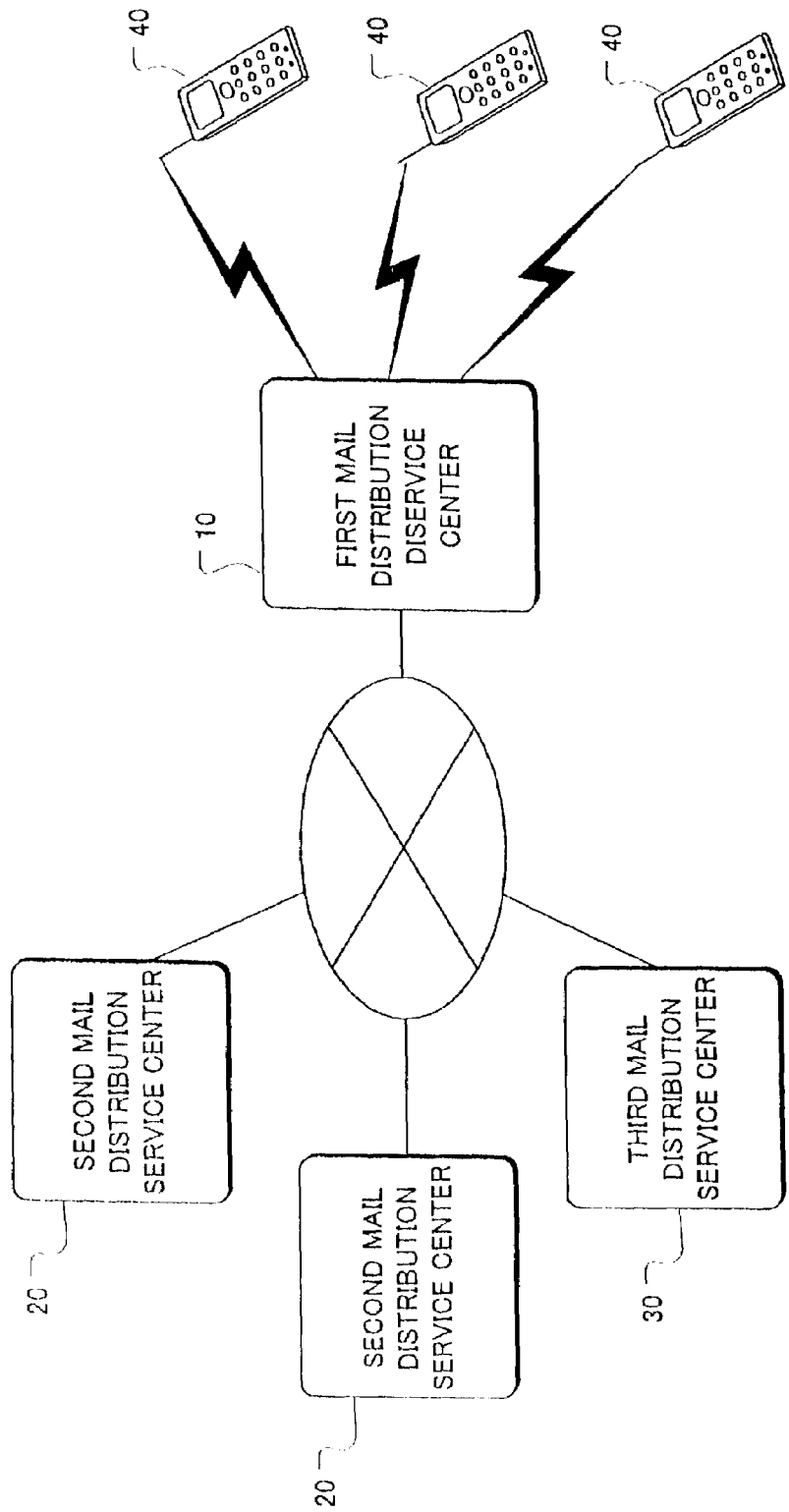
FIG. 1 shows an entire configuration of a first embodiment of a junk mail rejection system according to the present invention.

FIG. 1 shows an entire configuration of a junk mail rejection system according to the present invention.

Reference numeral 10 denotes a first mail distribution service center for providing a first mail distribution service. In this embodiment, the first mail distribution service is an Internet service of a wireless telephone. As described later, the center 10 comprises distribution means for distributing information of an electronic mail to a wireless telephone 40 of a subscriber of the Internet electronic mail service (that is, the first mail distribution service) through a cable/wireless network. According to the embodiment, a center for offering an Internet electronic mail service of a wireless telephone is used as the first mail distribution service center 10. However, the present invention is not limited to this application, but a commercial Internet provider, or an Internet provider managed by a company, a university, an institute, etc. can be used as the first mail distribution service center 10. In this case, the information of the electronic mail can be transmitted from the Internet provider to a computer, a mobile information terminal, a cable telephone unit, etc. operated by a subscriber through Internet. The important object in this system is to reject the junk mail when a subscriber receives the electronic mail transmitted from the first mail distribution service center 10 using a wireless telephone, a mobile information terminal, a cable telephone unit, a computer, etc.

Reference numeral 20 denoted a second mail distribution service center for providing a second mail distribution service. The second mail distribution service center 20 can be, for example, a commercial Internet provider, or an Internet provider managed by a company, a university, an institute, etc., and a subscriber of the first mail distribution service has to also subscribe to the second mail distribution service. The second mail distribution service center 20 has transfer means for forwarding, as described later, the electronic mail addressed to a subscriber and transmitted to the second mail distribution service center 20 to a third mail distribution service center 30 explained below.

Reference numeral 30 denotes a third mail distribution service center. The third mail distribution service center 30 mainly performs a process for rejecting the junk mail. Subscribers of the first mail distribution service and the second mail distribution service also have to be subscribers of the third mail distribution service.

Figure 2:
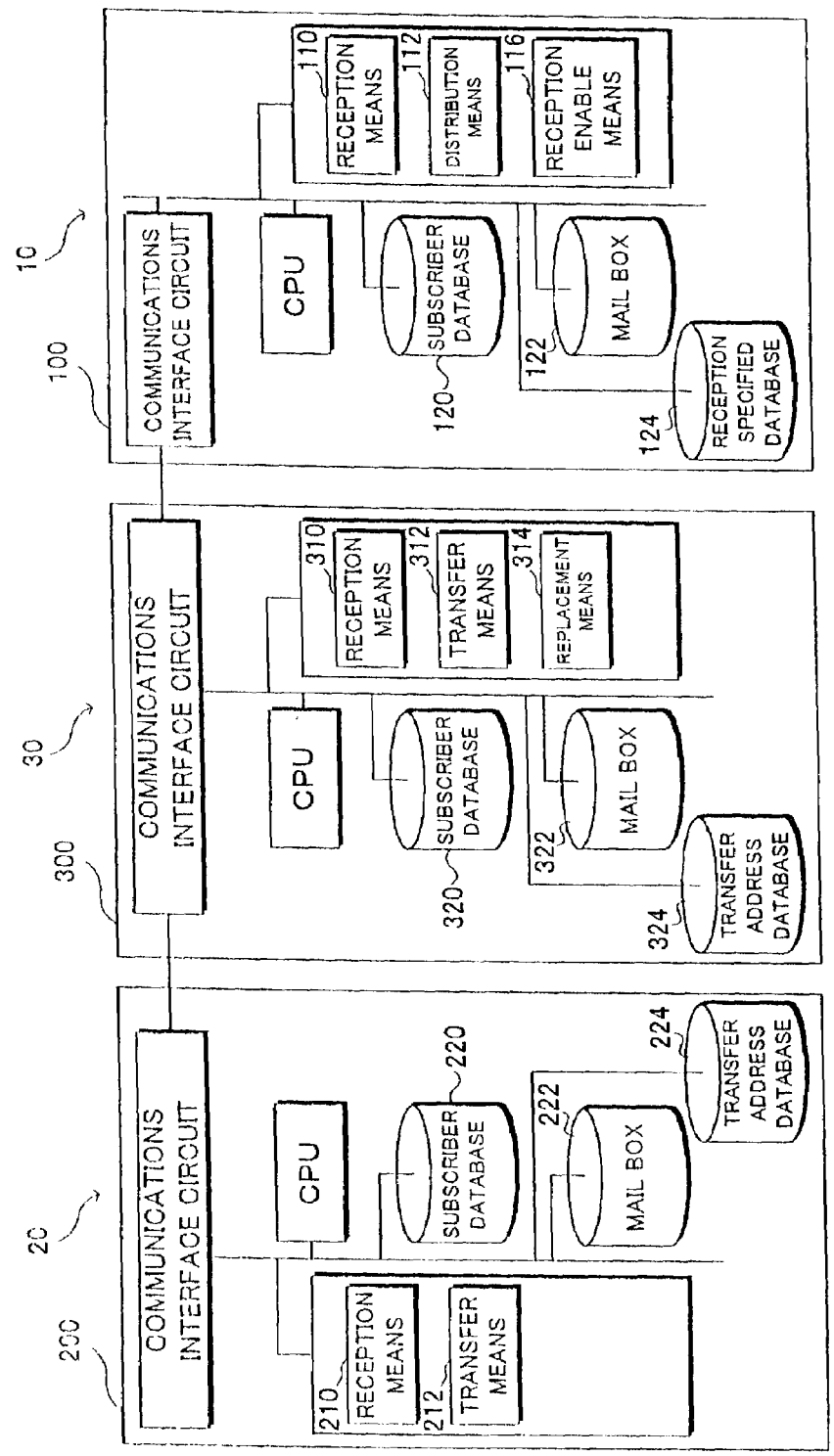
FIG. 2 is a block diagram of the entire junk mail rejection system according to the present invention.

FIG. 2 is a block diagram of the entire junk mail rejection system. The first mail distribution service center 10 has a WWW server 100 which can be connected to the Internet. The WWW server 100 comprises a CPU, RAM, ROM, a communications interface circuit, a storage device such as a fixed disk, etc. not shown in FIG. 2. The storage device is further provided with: a subscriber database 120 for storing the first electronic mail address of a subscriber, a wireless telephone number, and other attribute information about the subscriber; a mailbox 122 for storing the information of electronic mail transmitted to a first electronic mail address for each first electronic mail address of the subscriber; and a reception specified database 124 for storing the information about the electronic mail address (acceptable electronic mail address) of the source of the electronic mail permitted by the subscriber for reception for each first electronic mail address of the subscriber. The program stored in the WWW server 100 is executed by the CPU to allow the WWW server 100 to perform the following functions. To perform the functions, the WWW server 100 comprises: reception means 110 for receiving the electronic mail specifying the IP address of the WWW server 100 and storing it in the mailbox 122; distribution means 112 for transmitting the electronic mail received by the WWW server 100 to the wireless telephone 40 at the destination; and reception enable means 116 for determining whether or not the electronic mail address of the source of the electronic mail received by the reception means 110 is the acceptable electronic mail address registered in the reception specified database 124.

Like the first mail distribution service center 10, the second mail distribution service center 20 has a WWW server 200 which can be connected to the Internet. The WWW server 200 comprises a CPU, a RAM, a ROM, a communications interface circuit, a storage device such as a fixed disk, etc. not shown in FIG. 2. The storage device is further provided with: a subscriber database 220 for storing the second electronic mail address of a subscriber and other attribute information about the subscriber; a mailbox 222 for storing the information of electronic mail transmitted to a second electronic mail address for each second electronic mail address of the subscriber; and a transfer address database 224 for storing the information about the forwarding electronic mail address to which the electronic mail transmitted to the second electronic mail address is to be forwarded, for each second electronic mail address of the subscriber. The program stored in the WWW server 200 is executed by the CPU to allow the WWW server 200 to perform the following functions. To perform the functions, the WWW server 200 comprises: reception means 210 for receiving the electronic mail specifying the IP address of the WWW server 200 and storing it in the mailbox 222; and transfer means 212 for forwarding the electronic mail received by the WWW server 200 to the forwarding electronic mail address stored in the transfer address database 224.

Like the first mail distribution service center 10 or the second mail distribution service center 20, the third mail distribution service center 30 has a WWW server 300 which can be connected to Internet. The WWW server 300 comprises a CPU, a RAM, a ROM, a communications interface circuit, a storage device such as a fixed disk, etc. not shown in FIG. 2. The storage device is further provided with: a subscriber database 320 for storing the third electronic mail address of a subscriber and the attribute information about other subscribers; a mailbox 322 for storing the information of electronic mail transmitted to a third electronic mail address for each third electronic mail address of the subscriber; and a transfer address database 324 for storing the information about the forwarding electronic mail address to which the electronic mail transmitted to the third electronic mail address of a subscriber is to be forwarded, for every third electronic mail address of the subscriber. The program stored in the WWW server 300 is executed by the CPU to allow the WWW server 300 to perform the following functions. To perform the functions, the WWW server 300 comprises: reception means 310 for receiving the electronic mail specifying the IP address of the WWW server 300 and storing it in the mailbox 322; transfer means 312 for forwarding the electronic mail received by the WWW server 300 to the forwarding electronic mail address stored in the transfer address database 324; and replacement means 314 for replacing the source of the electronic mail received by the reception means 310 with the destination.

Described below will be the operation of rejecting junk mail in the system with the above mentioned configuration.

Figure 3:
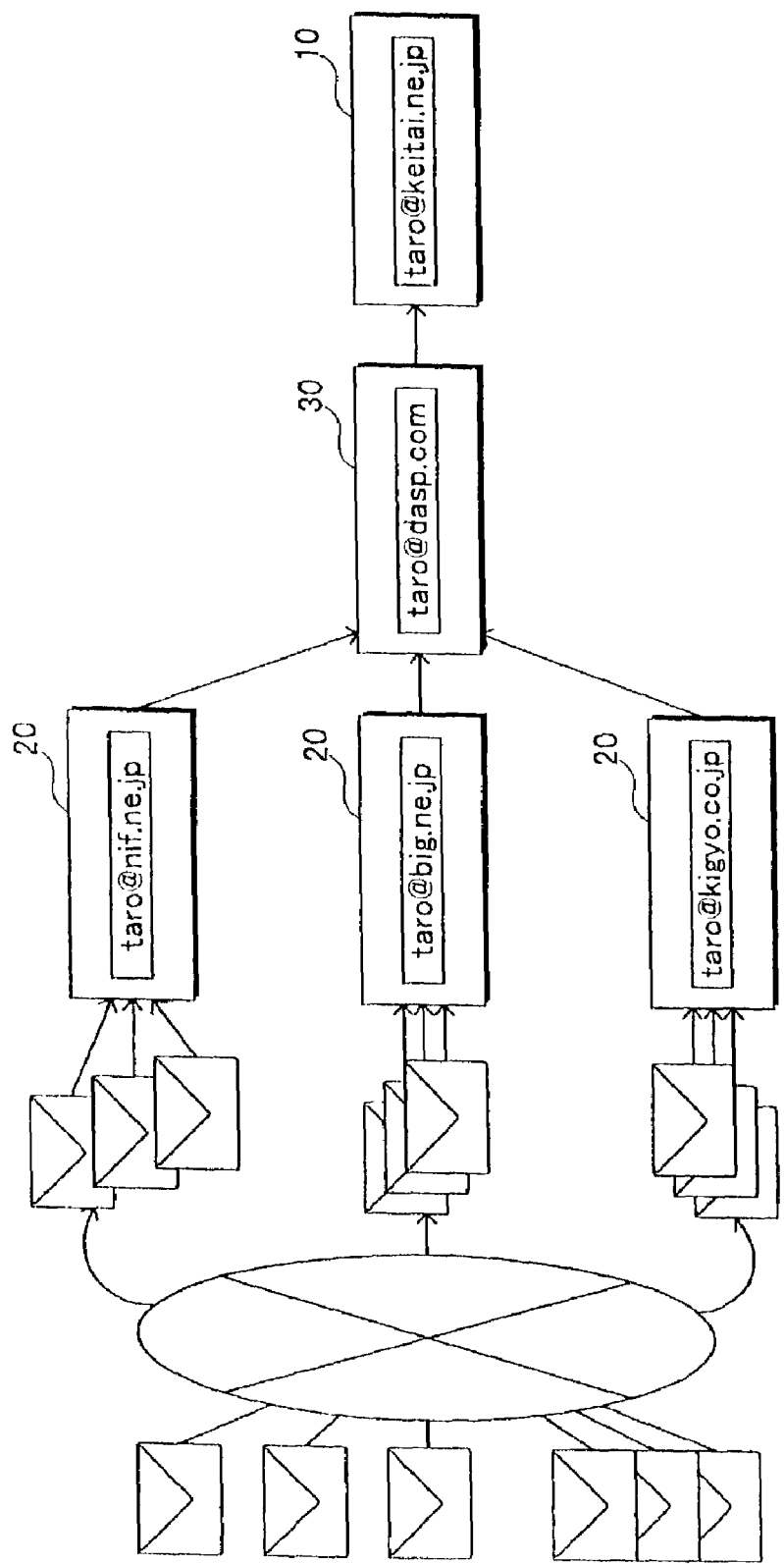
FIG. 3 shows a relationship between the first to third mail distribution services and the first to third electronic mail addresses.

As described above, the subscriber subscribes to all of the Internet electronic mail service (first mail distribution service) of the first mail distribution service center 10, the second mail distribution service of the second mail distribution service center 20, and the third mail distribution service of the third mail distribution service center 30. The subscriber obtains the first, second, and third electronic mail addresses respectively in the mail distribution service centers 10, 20 and 30. The subscriber (TARO) in this example is assumed to subscribe to, for example, three types of the second mail distribution services, that is, two commercial Internet provider and an Internet provider for a company to which the subscriber belongs. As a practical example, the first electronic mail address is taro@keitai.ne.jp, the three types of the second electronic mail addresses are taro@nif.ne.jp, taro big.ne.jp, and taro@kigyo.co.jp, and the third electronic mail address is taro@dasp.com as shown in FIG. 3.

Figure 4:
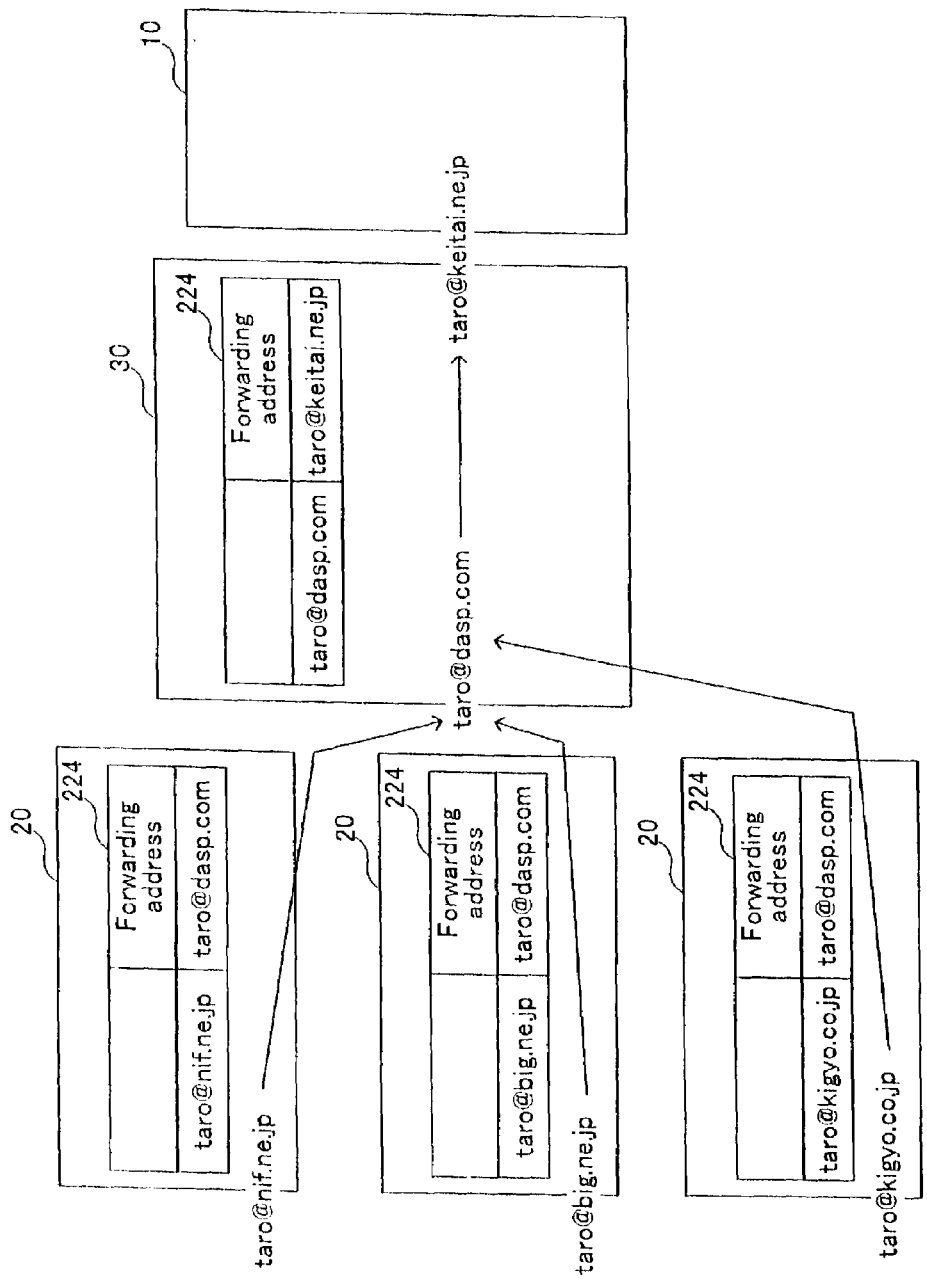
FIG. 4 shows a transfer relationship between the first to third mail distribution services and the first to third electronic mail addresses.

In the first mail distribution service, the second electronic mail addresses taro@nif.ne.jp, taro@big.ne.jp, and taro@kigyo.co.jp are registered in the reception specified database 124 corresponding to the first electronic mail address taro@keitai.ne.jp of the subscriber as acceptable electronic mail addresses. In addition to these addresses, any other mail addresses requested to be received by the subscriber, for example, the electronic mail address tomo1@keitai.ne.jp of a friend 1, the electronic mail address tomo2@kigyo2.ne.jp of a friend 2, etc. can be registered as acceptable electronic mail addresses. In the three types of second mail distribution services, the third electronic mail address taro@dasp.com is registered in each transfer address database 224 as a forwarding electronic mail address corresponding to the second electronic mail addresses taro@nif.ne.jp, taro@big.ne.jp, and taro@kigyo.co.jp of the subscriber, respectively. In the third mail distribution service, the first electronic mail address taro@keitai.ne.jp is registered in the transfer address database 324 as a forwarding electronic mail address corresponding to the third electronic mail address taro@dasp.com of the subscriber (refer to FIG. 4).

Figure 5:
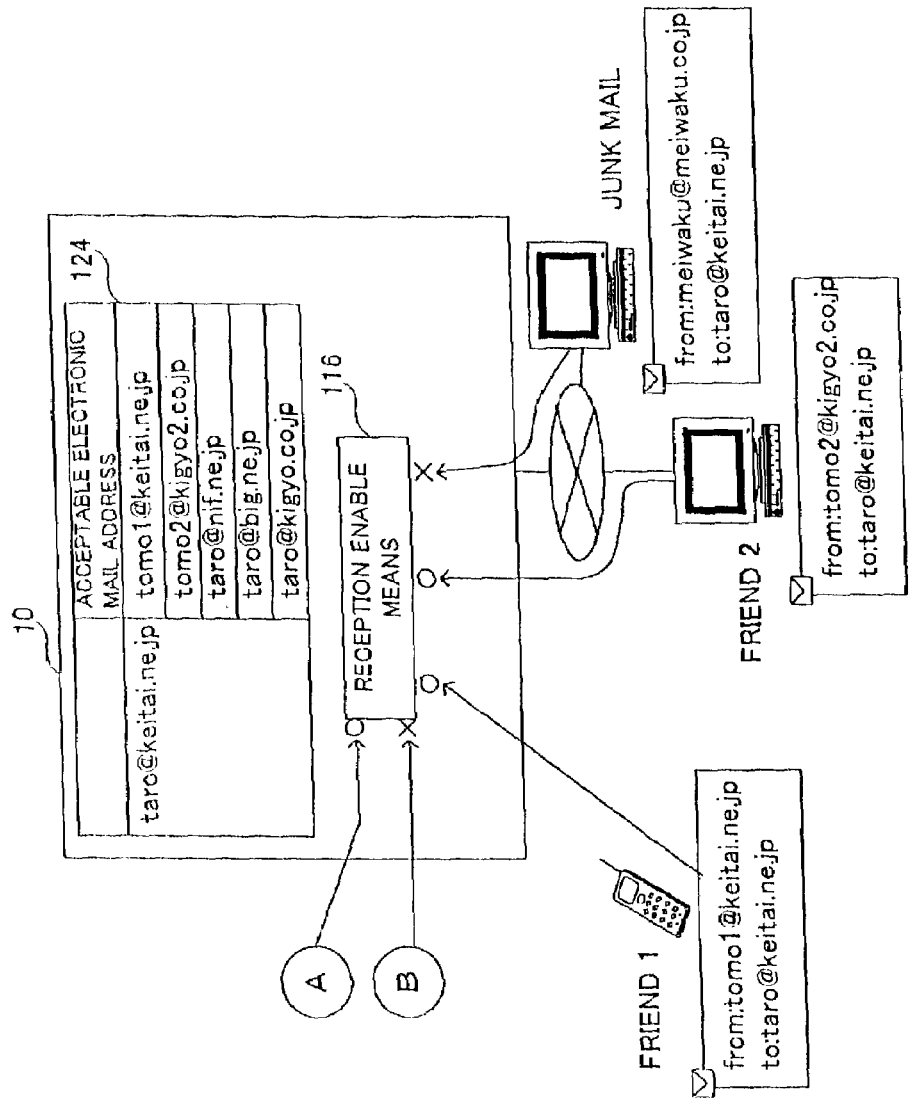
FIG. 5 is a part of a view showing a principle of rejecting junk mail.
Figure 6:
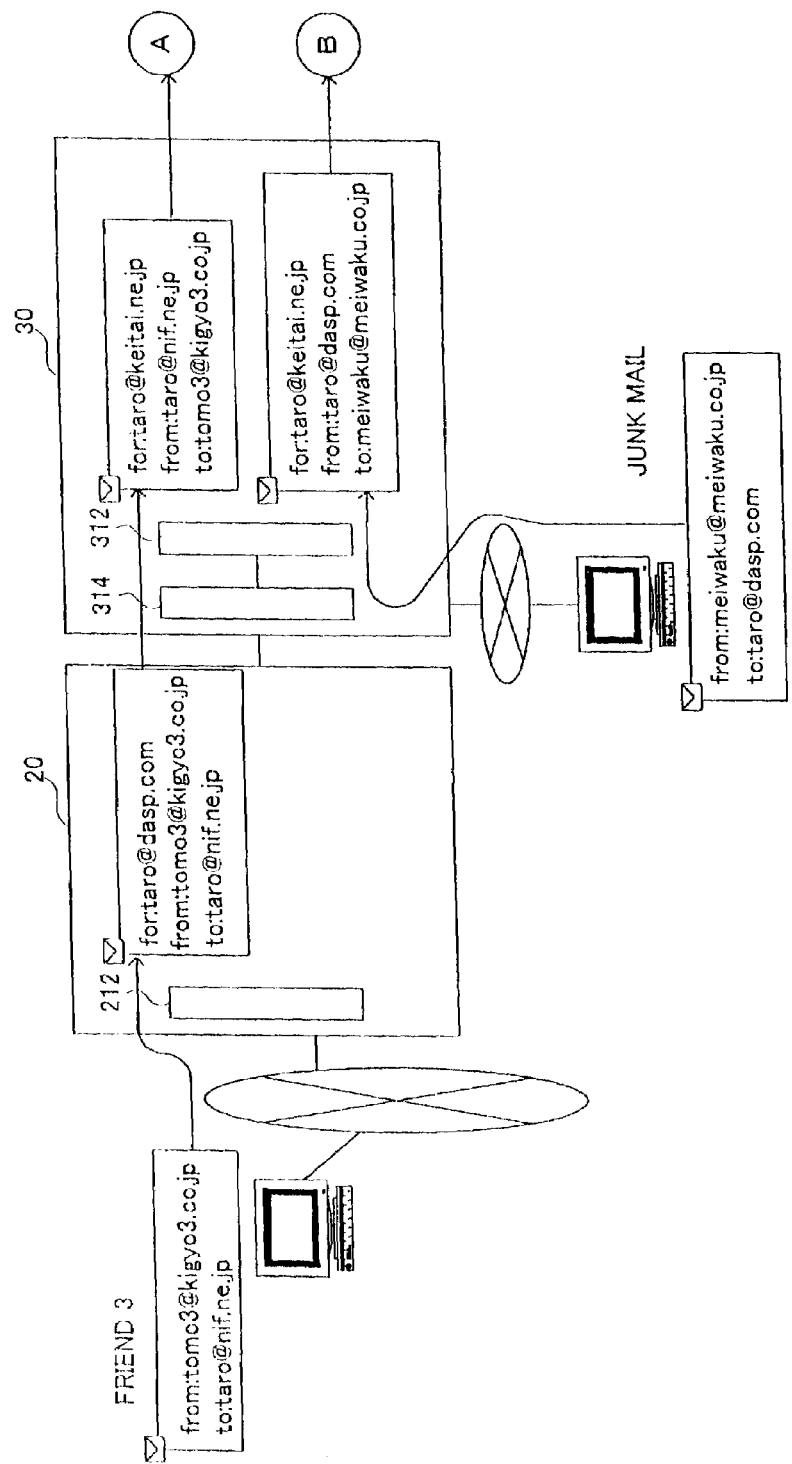
FIG. 6 is a remaining part of FIG. 5 showing the principle of rejecting junk mail.

As shown in FIGS. 5 and 6, assume that electronic mail is transmitted to the subscriber from the friend 1. The electronic mail address of the source of the electronic mail is the electronic mail address of the friend 1, that is, from=tomo1@keitai.ne.jp, and the electronic mail address of the destination is the first electronic mail address, that is, to=taro@keitai.ne.jp. The information of the electronic mail transmitted to the first mail distribution service center 10 through a cable/wireless network is received by the reception means 120 of the first mail distribution service center 10, and then the reception enable means 116 determines whether or not the source address of the electronic mail is an acceptable electronic mail address. In this case, it is one of the acceptable electronic mail addresses, determined to be acceptable, and stored in the mailbox 122 corresponding to taro@keitai.ne.jp. Then, the information of the electronic mail is transmitted by the distribution means 112 to the wireless telephone 40 of the subscriber, and the subscriber can correctly receive the electronic mail of the friend 1 whose mail is reception enabled. Similarly, the electronic mail of the friend 2 can be received.

When junk mail is transmitted by using the first electronic mail address of the subscriber as a target, the electronic mail address of the source is the electronic mail address of the junk mail transmitter, that is, from=meiwaku@meiwaku.co.jp, and the destination electronic mail address is the first electronic mail address, that is, to=taro@keitai.ne.jp. It is received by the reception means 110 of the first mail distribution service center 10, and then, the reception enable means 116 determines whether or not the source address of the electronic mail is an acceptable electronic mail address. Since junk mail has not an acceptable electronic mail address and is rejected, and is not stored in the mailbox 122. The distribution means 112 returns rejection notification mail to the source, thereby rejecting the junk mail to the subscriber and successfully avoiding damage.

Figure 7:
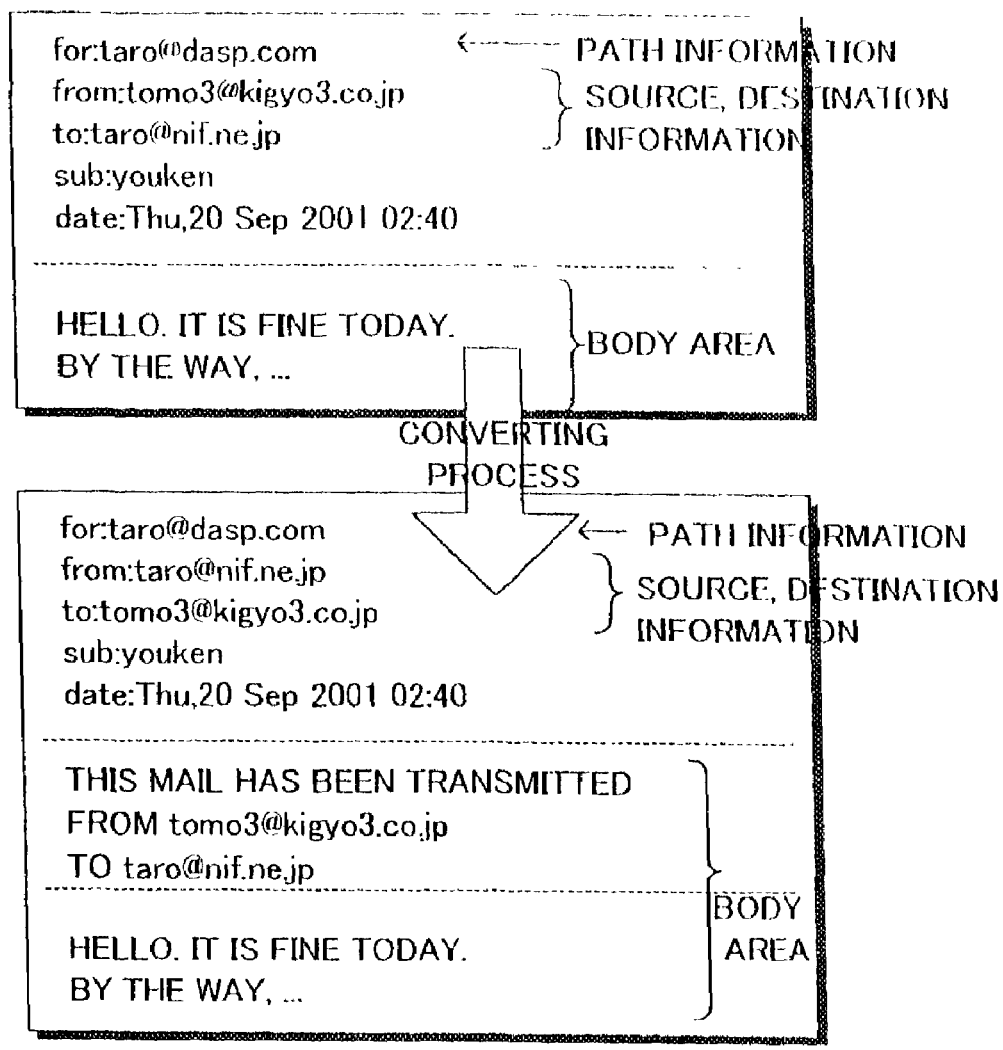
FIG. 7 shows a part of a source display of electronic mail before and after the process performed by the replacement means.

However, only the mail from the electronic mail addresses registered in the reception specified database 124 can be received in the above mentioned method. In addition to the friends 1 and 2, friends 3, 4, . . . who possibly transmit electronic mail to the subscriber, and whose electronic mails are requested to be received by the subscriber are notified of any of the second electronic mail addresses taro@nif.ne.jp, taro@big.ne.jp, and taro@kigyo.co.jp for transmission of electronic mail. Assume that the friend 3 transmits electronic mail using taro@nif.ne.jp as a destination. The information about the electronic mail transmitted to the second mail distribution service center 20 through the Internet is received by the reception means 210 of the second mail distribution service center 20, and is stored in the mailbox 222. Simultaneously, the information of the electronic mail is forwarded by the transfer means 212 to the third electronic mail address taro@dasp.com of the third mail distribution service center 30. At this time, the information of the source and destination maintains to be the original. The source is the electronic mail address of the friend 3, that is, from=tomo3@kigyo3.co.jp, and the destination is the second electronic mail address, that is, to=taro@nif.ne.jp. However, the path information about the electronic mail is the third electronic mail address, that is, for=taro@dasp.com as forwarding address. The electronic mail is received by the reception means 310 of the third mail distribution service center 30, and is stored in the mailbox 322. Then, the replacement means 314 replaces the source with the destination, and the destination with the source. That is, the source is set to from=taro@nifne.jp, and the destination is set to to=tomo3@kigyo3.co.jp. As shown in FIG. 7, the sentence of 'This mail has been transmitted from tomo3@kigyo3.co.jp to taro@nif.ne.jp.' is inserted into the body data of the electronic mail. The tomo3@kigyo3.co.jp has been converted into hot text, and if it is clicked, it activates a mailer for reply mail.

The transfer means 312 forwards the information of the electronic mail to the first electronic mail address taro@keitai.ne.jp of the first mail distribution service center 10. The reception means 120 of the first mail distribution service center 10 receives the information, and the reception enable means 116 determines whether or not the source address of the electronic mail is an acceptable electronic mail address. At this time, the source of the electronic mail is taro@nif.ne.jp which is an acceptable electronic mail address. Therefore, the mail can be received, and the distribution means 112 transmits the information of the electronic mail to the wireless telephone 40 of the subscriber. Therefore, the subscriber does not have to specify its reception permission in advance, but the electronic mail of the friend 3 whose mail is to be reception-enabled can be correctly received when it is transmitted.

Thus, the junk mail addressed to the first electronic mail address taro@keitai.ne.jp of the subscriber registered in the first mail distribution service center 10 can be rejected, and the electronic mail from a person whose mail is to be reception-enabled, other than the reception-specified mail, can be received. When junk mail is addressed to the second electronic mail addresses taro@nif.ne.jp, taro@big.ne.jp, and taro@kigyo.co.jp, the replacement means 314 of the third mail distribution service center 30 automatically forwards the junk mail to the wireless telephone 40 through the first mail distribution service center 10. However, in this case, the risk of the first mail distribution service center 10 is the same in level as the risk of the Internet provider managed by other commercial providers, companies, universities, institutes, etc. That is, only when junk mail is addressed to the second mail distribution service center 20, the first mail distribution service center 10 is a target of the junk mail, thereby avoiding the concentration of damage on the first mail distribution service center 10 only. Therefore, the risk of receiving junk mail can be shared among all first and second mail distribution service centers 10 and 20.

Described below will be the case in which junk mail is addressed to the third mail distribution service center 30. When the reception means 310 of the third mail distribution service center 30 receives junk mail, the replacement means 314 replaces the source with the destination, and the destination with the source. That is, the source is the third electronic mail address taro@dasp.com, and the destination is the electronic mail address of the junk mail transmitter, that is, meiwaku@meiwaku.co.jp. The mail is forwarded to the first mail distribution service center 10. Since the third electronic mail address taro@dasp.com is not registered as an acceptable electronic mail address in the reception specified database 124 of the first mail distribution service center 10, the reception enable means 116 rejects receiving the junk mail. Thus, the reception of the junk mail can be rejected.

In the above mentioned embodiment, a second replacement means for replacing the source with the destination can be provided in order to restore the source and the destination replaced by the replacement means 314 to the original states before distributing electronic mail from the distribution means 112 of the first mail distribution service center 10 to the wireless telephone 40.

(Protection Against Acts of Terrorism)

As described above, according to the first embodiment, the risk of receiving junk mail can be shared among all first and second mail distribution service centers. Described below will be the system for protection against damage from concentrative and intentional transmission of a large amount of junk mail.

Figure 8:
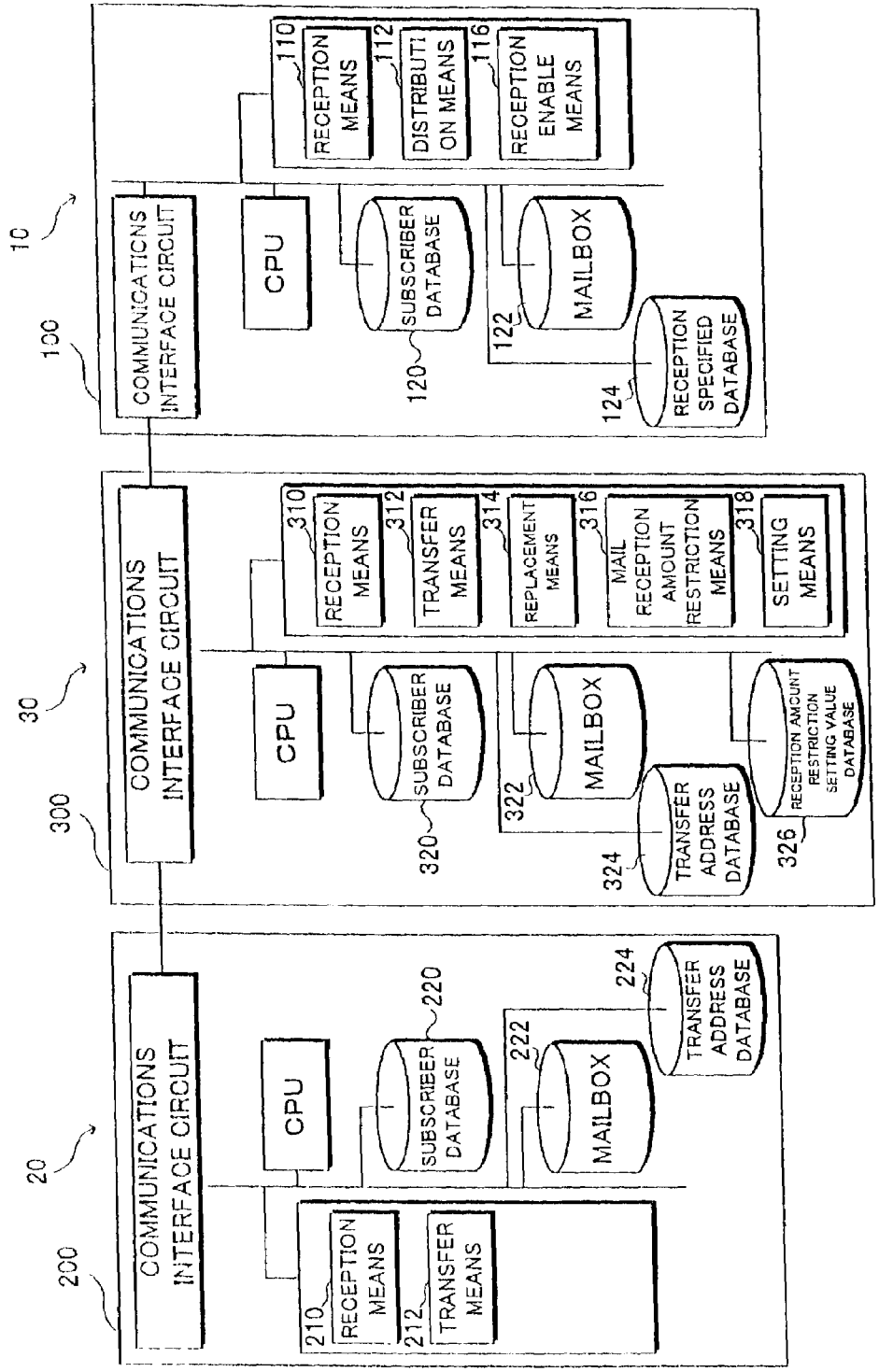
FIG. 8 is an entire block diagram of a second embodiment of the junk mail rejection system according to the present invention.
Figure 9:
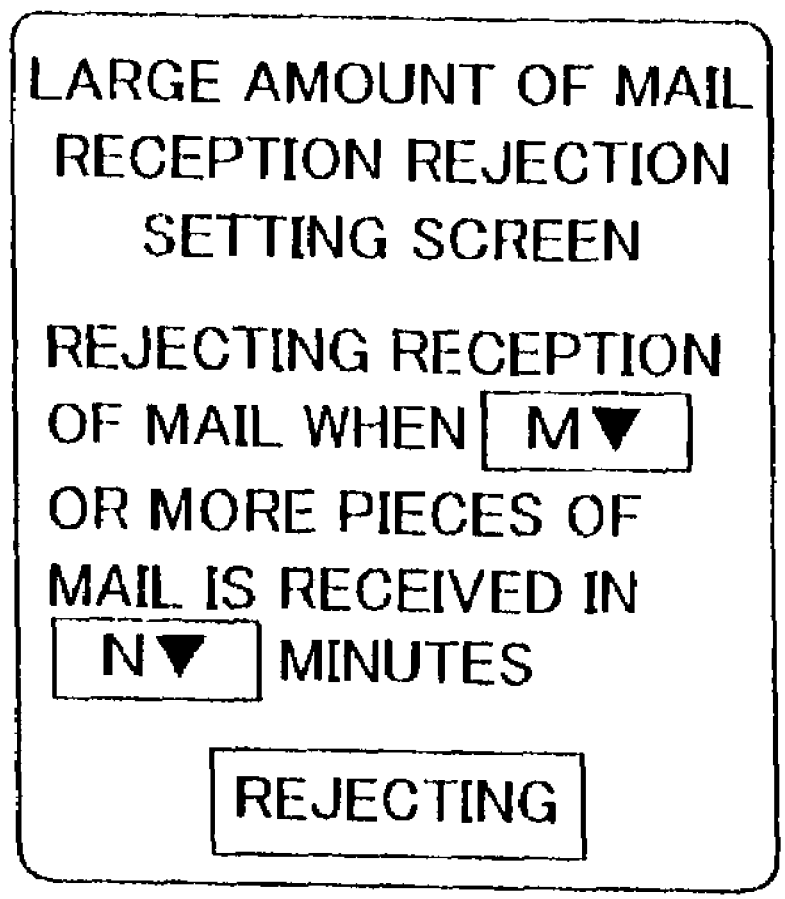
FIG. 9 shows an example of a setting screen of restricting the amount of received mail.

FIG. 8 is a block diagram of a configuration of a second embodiment of protection against terrorism. The configuration which is the same as or similar to that shown in FIG. 1 is assigned the same reference numeral, and the detailed explanation is omitted here. The second embodiment is different from the first embodiment in that it comprises a mail reception amount restriction means 316 and a setting means 318 as functions that the WWW server 300 performs by the program stored in the WWW server 300 of the third mail distribution service center 30. The WWW server 300 is provided with a reception amount restriction setting value database 326, and the reception amount restriction setting value database 326 stores the set values of the mail reception monitor time and the number of restrictions for each of the third electronic mail address of the subscriber. The set values can be set on the WEB by a subscriber. After the setting means 318 is activated, the setting means 318 receives the set values input from the wireless telephone 40 of the subscriber or the computer, and stores it in the reception amount restriction setting value database 326. FIG. 9 shows an example of a set screen of a display of the terminal. The mail reception monitor time and the number of restrictions can be freely selected by a subscriber. However, the set items are not limited to this application. For example, one of them can be a predetermined value.

In the present embodiment, the mail reception amount restriction means 316 is constantly activated, and determines whether or not the amount of electronic mail has reached the set value (M pieces) in the set period (N minutes) based on the reception time of electronic mail received by the reception means 310 of the third mail distribution service center 30 and the set values stored by the reception amount restriction setting value database 326. If the amount is equal to or smaller than the predetermined value, then the electronic mail is forwarded by the transfer means 312 to the first mail distribution service center 10 after the replacing process is performed by the replacement means 314 as in the first embodiment. If the amount has exceeded the predetermined value, then the transfer of the overflowing mail to the first mail distribution service center 10 is stopped. The electronic mail exceeding the predetermined value is deleted by the mail reception amount restriction means 316. Although there is a large amount of received mail all of which is not junk mail, and there are non-junk mail and junk mail in a mixed manner, non junk mail is deleted when it exceeds a predetermined value. However, non-junk mail must have been forwarded to the third mail distribution service center 30 from all second mail distribution service centers 20, and these pieces of electronic mail are stored in the mailbox 222 of the second mail distribution service center 20. Therefore, the subscriber can read the deleted mail by accessing the second mail distribution service center 20 and viewing the received mail.

Figure 10:
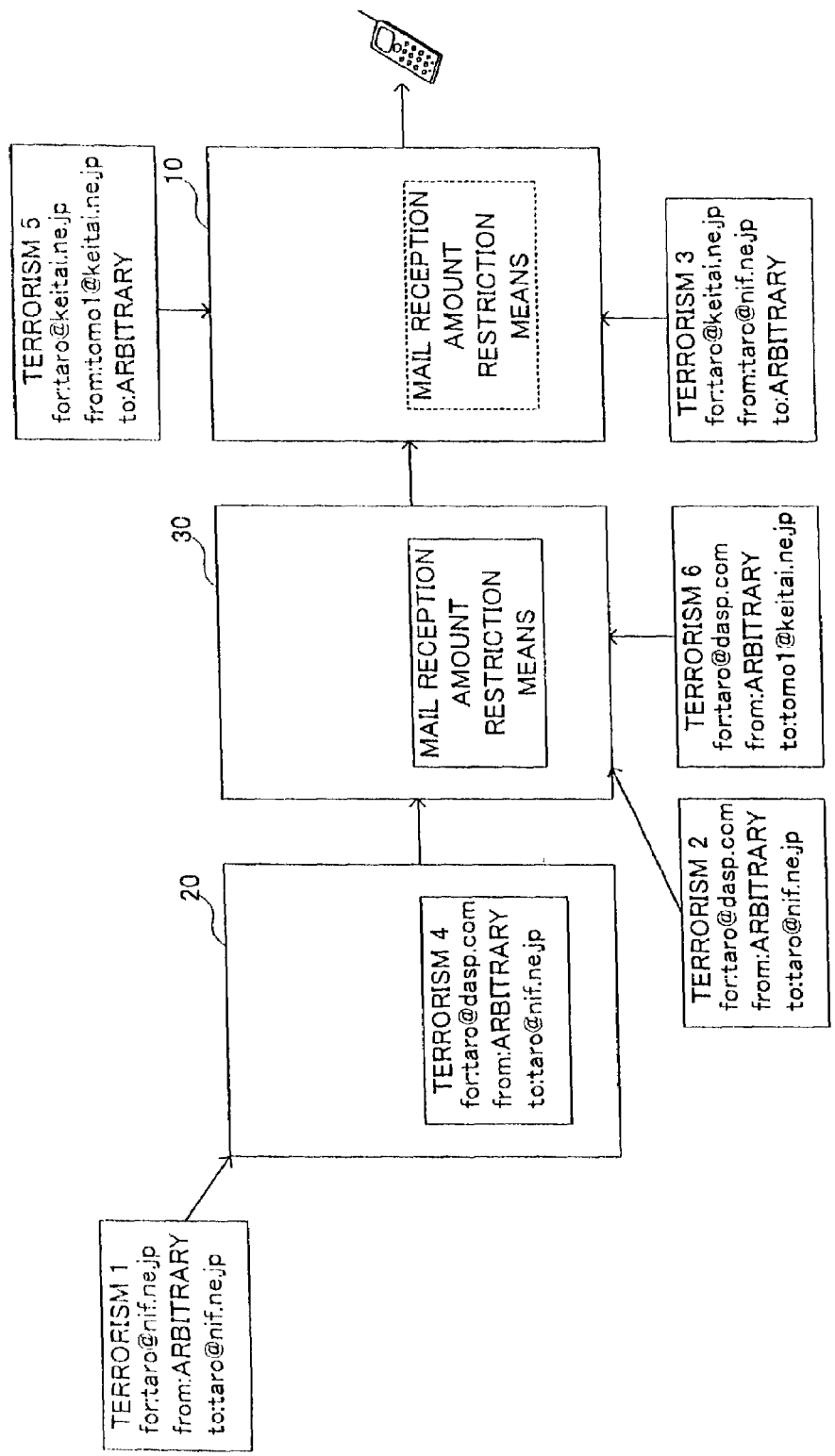
FIG. 10 shows possible patterns of acts of terrorism.

FIG. 10 shows possible patterns of acts of terrorism. In FIG. 10, terrorism 1 indicates the case in which a large amount of electronic mail has been transmitted to any of the second electronic mail addresses taro@nif.ne.jp, taro@big.ne.jp, and taro@kigyo.co.jp.

Terrorism 2 indicates the case in which a large amount of electronic mail has been transmitted to the third electronic mail address of the third mail distribution service center 30 by pretending that mail has been forwarded from any of the second electronic mail addresses taro@nif.ne.jp, taro@big.ne.jp, and taro@kigyo.co.jp of the second mail distribution service center 20 (that is, any of the second electronic mail addresses is designated as the destination).

Terrorism 3 indicates the case in which pretending as if electronic mail has been forwarded from the third electronic mail address of the third mail distribution service center 30, a large amount of mail has been transmitted to the first electronic mail address of the first mail distribution service center 10 with the destination is designated to be any of the second electronic mail addresses taro@nif.ne.jp, taro@big.ne.jp, and taro@kigyo.co.jp.

Terrorism 4 indicates the case in which a large amount of electronic mail has been transmitted to the third electronic mail address of the third mail distribution service center 30 from inside the second mail distribution service center 20.

Terrorism 5 indicates the case in which a large amount of electronic mail has been transmitted to the first electronic mail address of the first mail distribution service center 10 by pretending as if the mail has been transmitted from an acceptable electronic mail address.

Terrorism 6 indicates that a large amount of electronic mail has been transmitted to the third electronic mail address of the third mail distribution service center 30 by pretending as if the mail has been transmitted to an acceptable electronic mail address.

In the above mentioned terrorism 1 to 6, although processes are performed by the replacement means 314 of the third mail distribution service center 30, the junk mail passes through the reception enable means 116 of the first mail distribution service center 10. Therefore, with the configuration according to the first embodiment, a subscriber suffers acts of terrorism of a large amount of mail. However, the mail reception amount restriction means 316 of the third mail distribution service center 30 can avoid the terrorism 1, 2, 4, and 6.

The terrorism 3 and 5 cannot be rejected by the mail reception amount restriction means 316, but can be avoided by providing similar mail reception amount restriction means in the first mail distribution service center 10.

(Reception from Unspecified Source)

Described below will be the system of not equally and completely rejecting junk mail, but permitting the reception of electronic mail from an unspecified source which is not junk mail depending on the subscriber.

Figure 11:
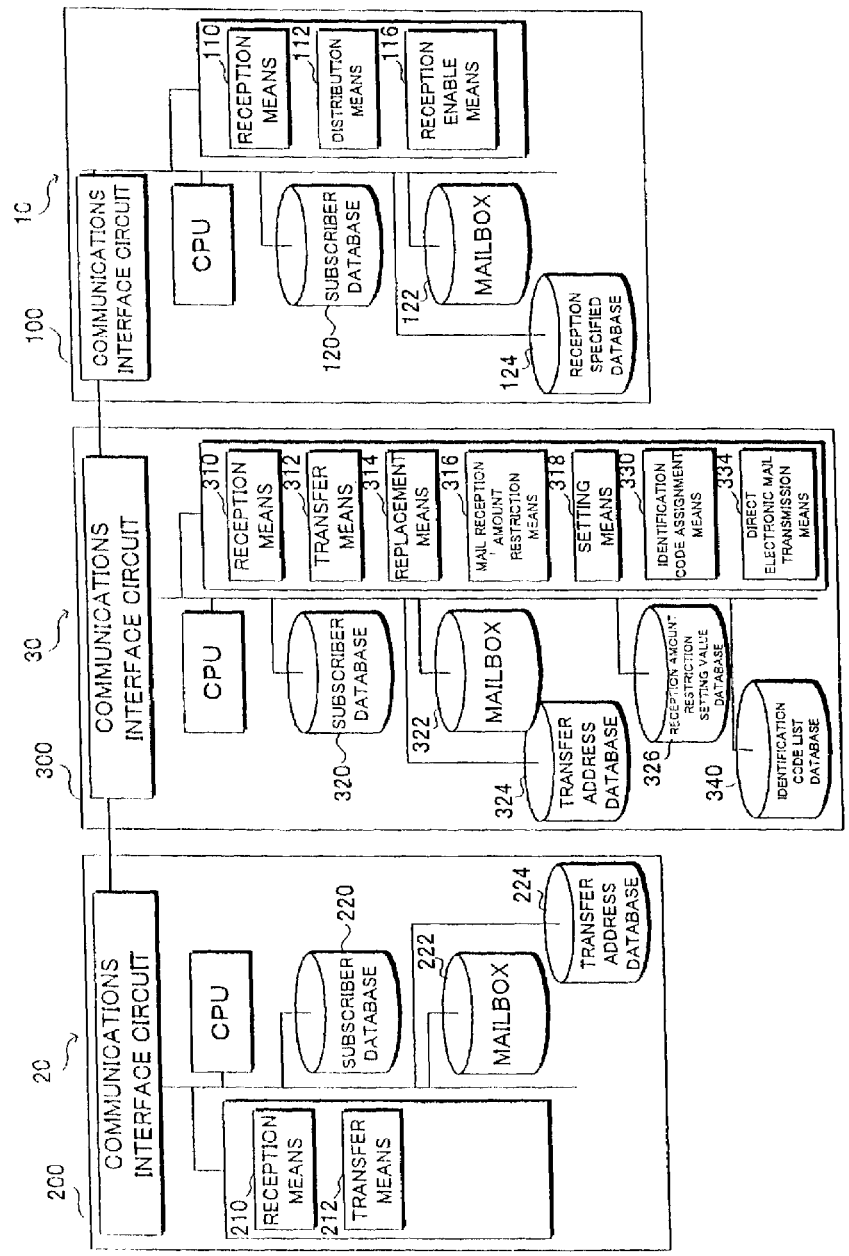
FIG. 11 is an entire block diagram of a third embodiment of the junk mail rejection system according to the present invention.

FIG. 11 is a block diagram of the configuration according to a third embodiment in which electronic mail can be received. A component which is the same as or similar to that shown in FIG. 1 is assigned the same reference numeral, and the detailed explanation thereof is omitted. This example is different from the above mentioned embodiments in that it comprises identification code assignment means 330 and direct electronic mail transmission means 334 as functions that the WWW server 300 performs by the program stored in the WWW server 300 of the third mail distribution service center 30. Furthermore, the WWW server 300 is provided with an identification code list database 340, and the subscriber database 320 stores an identification code DASP and a specified mail address associated with each subscriber.

Figure 12:
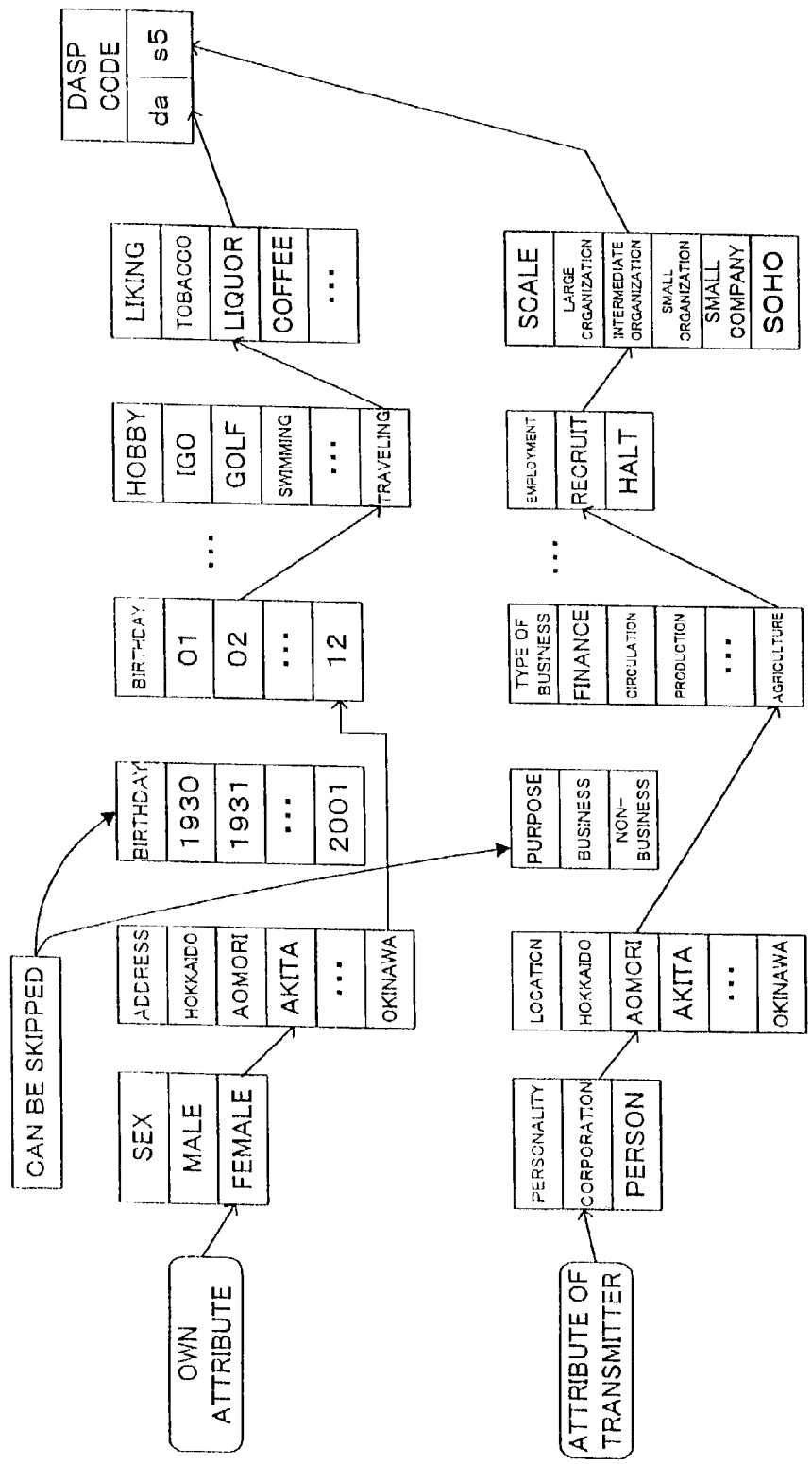
FIG. 12 shows an example of inquiry items for determination of identification codes, and selection items.

The identification code DASP is a code indicating the attribute including the hobby, the liking, etc. of a subscriber and the attribute of a transmitter whose mail can be received by the subscriber in the electronic mail among many and unspecified persons. The subscriber is assigned an identification code when he or she subscribes to the third mail distribution service center 30. To assign the identification code, a plurality of inquiry items and corresponding alternatives are prepared in a pull-down menu. In response to the inquiry items, the subscriber answers on the WEB. Based on the answer, the identification code assignment means 330 determines a corresponding identification code. FIG. 12 shows examples of the inquiry items and alternatives. The inquiry items are the sex, address, birthday, hobby, liking, etc. of the subscriber. Relating to a transmitter, the inquiry items are the personality, location, purpose, business type, employment, scale, etc. of the transmitter which can be accepted for the subscriber. It is not necessary to answer all of the inquiry items. The subscriber can decide that all electronic mail from all unspecified persons would be accepted without answering an inquiry, or all electronic mail from all unspecified persons would be rejected. Finally, the subscriber specifies an electronic mail address (specified mail address) to be received in the electronic mail from the unspecified sources. The mail address can be any of the second electronic mail addresses, or a quite different electronic mail address can be specified. When any of the second electronic mail addresses is specified, the wireless telephone 40 can receive the mail by the transfer as explained above by referring to the first embodiment. The identification code assignment means 330 stores the determined identification code and the specified mail address associated with the subscriber in the subscriber database 320.

FIG. 13 shows an example of a list of identification codes stored in the identification code list database 340. In this example, it is a 4-digit identification code two digits of which are used as the attribute of the subscriber and the remaining two digits are used as the attribute of the transmitter. It is obvious that the identification code can be represented by a larger number of digits for more detailed attribute classification. The data stored in an identification code list database 340 is published on the WEB. Furthermore, as shown in FIG. 14, the data can be processed and published. In the example shown in FIG. 14, a simple code, a part of the attribute of a subscriber, a part of the attribute of a transmitter, the number of registrants, an example of use, etc. are listed. A company wishing to transmit electronic mail views a published identification code list shown in FIG. 13 to select the attribute of the company itself and the attribute of a subscriber to receive the electronic mail of the company, specifies an identification code, body data, etc., transmits them to the third mail distribution service center 30, and requests the third mail distribution service center 30 to transmit the electronic mail. Otherwise, it views a published and processed list shown in FIG. 14, selects the attribute of the company itself and the attribute of a subscriber to receive the electronic mail of the company, specifies a simple code, body data, and the number of persons to receive electronic mail, transmits them to the third mail distribution service center 30, and requests the third mail distribution service center 30 to transmit the electronic mail. One simple code is a set of a plurality of identification codes. If the number of persons that the company wishes to transmit the electronic mail is smaller than the number of registrants, the company further selects more detailed attributes, and requests the third mail distribution service center 30 to transmit the electronic mail. The direct electronic mail transmission means 334 of the third mail distribution service center 30 extracts a subscriber having the corresponding identification code from the subscriber database 320, extracts the specified mail address of the subscriber, generates electronic mail to the mail address, and then transmits the mail. For example, the company can request the third mail distribution service center 30 to transmit advertising electronic mail to 100 subscribers who have the common hobby, and are probable purchasers of a new product. If the specified mail address is a second electronic mail address, it is transferred to the wireless telephone 40 through the third mail distribution service center 30 and the first mail distribution service center 10. If the specified mail address is quite different from the first to the third electronic mail addresses used in this system, then the mail is not transferred to the wireless telephone 40.

For a subscriber who receives the mail, the electronic mail is an acceptable electronic mail. Therefore, the mail is not junk mail. If the subscriber specifically likes one piece of the electronic mail, then the electronic mail address gyousha@gyousha.co.jp of the electronic mail can be extracted from the body of the electronic mail 'This mail has been transmitted from gyousha@gyousha.co.jp to taro@nif.ne.jp' as shown in FIG. 7, and it can be specified as an acceptable electronic mail address of the first mail distribution service center 10. The transmitter who asks the third mail distribution service center 30 to transmit the electronic mail can transmit the electronic mail to subscribers having the common hobby and liking. Therefore, transmitting insignificant electronic mail can be avoided, thereby efficiently transmitting electronic mail.

(Urging Subscription to Third Mail Distribution Service)

To effectively utilize the functions described above by referring to the first to third embodiments, it is important to urge a larger number of subscribers to subscribe to the third mail distribution service center 30. Described below will be a system for promoting the subscription.

Figure 15:
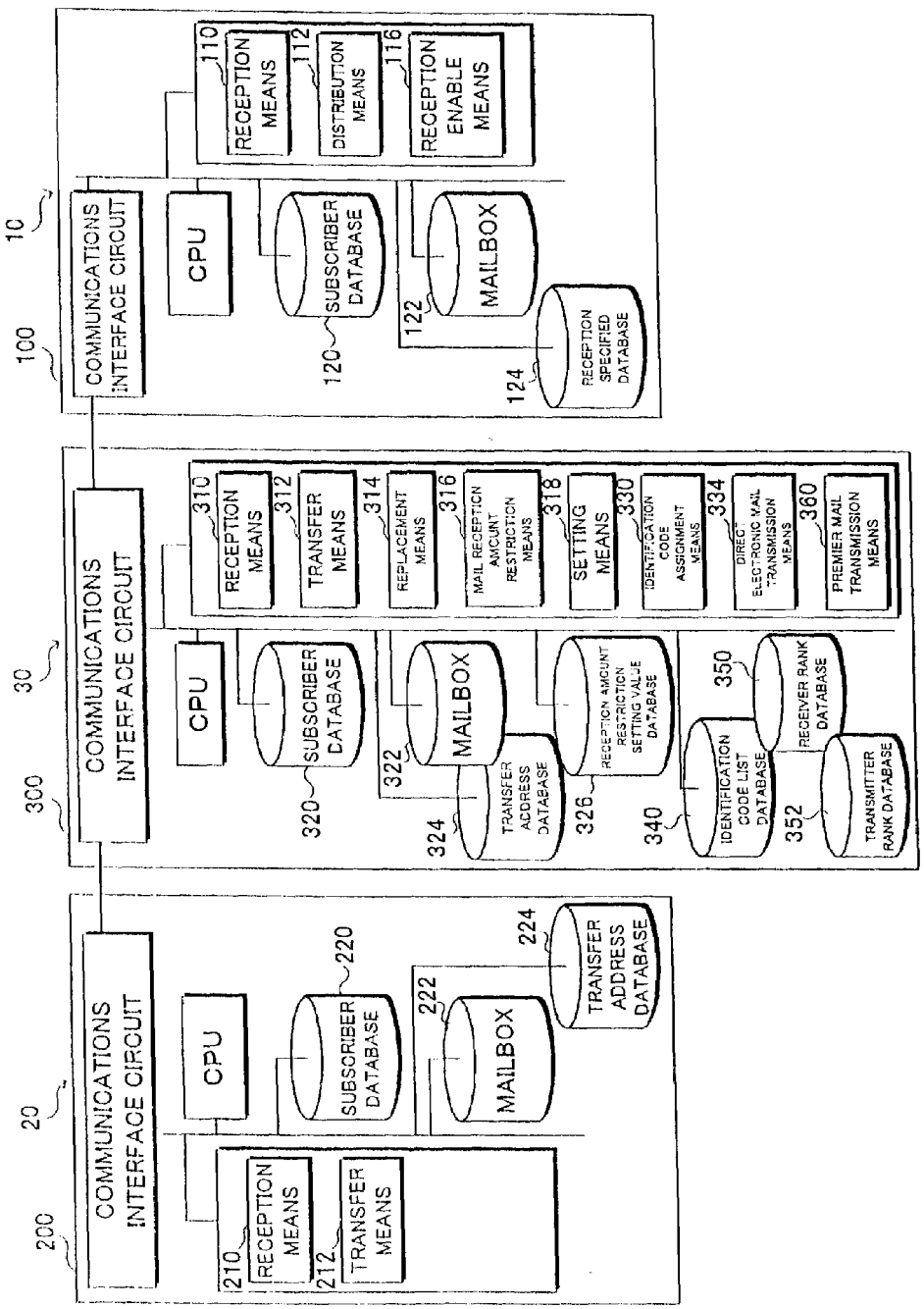
FIG. 15 is an entire block diagram according to a fourth embodiment of the junk mail rejection system according to the present invention.

FIG. 15 is a block diagram of the configuration according to a fourth embodiment of promoting the subscription. In FIG. 15, the difference from the third embodiment is that the third mail distribution service center 30 further comprises a receiver rank database 350 for storing ranked data of subscribers (that is, a receiver) who receives the electronic mail, and a transmitter rank database 352 for storing the data evaluating a company which requests the third mail distribution service center 30 to transmit electronic mail or a person (that is, transmitters) who requests to be evaluated. It comprises a premier mail transmission means 360 as the function that the WWW server 300 performs by the program stored in the WWW server 300 of the third mail distribution service center 30.

The receiver rank database 350 stores the number of the premier mail reception count indicating the number of received pieces of the premier mail obtained by the subscriber for each month, and the rank for each subscriber. The rank is divided into a plurality of levels such as platinum, gold, silver, metal, etc. by the number of the premier mail reception count. The premier mail is mixed at random at a certain probability when the direct electronic mail is transmitted. Therefore, if a larger number of pieces of direct electronic mail is received, the probability that premier mail can be obtained is stronger on the receiver side. That is, if the range of the reception-enabled transmitters from among unspecified persons is larger, then a larger amount of electronic mail can be received from many and unspecified persons, thereby increasing the opportunity of receiving premier mail. In addition to the system of including premier mail at random, there is a system of intentionally including premier mail. In the intentional system, the intention principle is basically non-published to the receiver side. In the non-published system, not only the third mail distribution service center 30 intentionally performs the process, but also, for example it, transmits electronic mail at an intentional instruction on the transmitter side. With a certain intention, a time period, an attribute of a specific receiver, etc. is selected, and premier mail is transmitted. A certain intention can be an intention of the third mail distribution service center 30, or can be an intention of a transmitter. That is, the transmitter can be assigned a right to decide premier mail. To allow a receiver to obtain a larger amount of premier mail, the identification code of the subscriber to which the transmitter requests to transmit the electronic mail, can be published. Then it is possible to promote the receiver to select the identification code more to receive the premier mail.

Then, the transmitter rank database 352 stores the number of votes indicating the evaluation of the transmitter for each transmitter. The voting is performed by a receiver. A receiver at a higher rank can be assigned a larger number of voting rights. The transmitter evaluated by the vote of a receiver can be a company requesting the third mail distribution service center 30 to transmit electronic mail as described above in the third embodiment. In addition, the rights to capture votes can be obtained by applying for the third mail distribution service center 30. The vote can be in the positive and negative manners, and a vote can be transmitted by electronic mail to the third mail distribution service center 30. When the transmitter sells or provides an excellent product or contents to the receiver side, the transmitter can obtain a good evaluation from the receivers, thereby collecting a larger number of votes. A transmitter having a right to capture a vote can publish his or her corporate concept, personal creed, etc. on the WEB, and the subscriber can view them on the WEB. Thus, the transmitter can be checked by a consumer.

An incentive plan can be set to a receiver for each rank. The contents of the receiver rank database 350 are processed, and the order of the higher ranks can be viewed on the WEB so that the order can be checked at any time by any receiver (for example, as shown in FIG. 16). Furthermore, the rule of raising a rank may be published. A privilege may be set to the higher rank holders.

Furthermore, the contents of the transmitter rank database 352 are processed, and the higher order in the voting state can be viewed in real time on the WEB. Ranking may be set depending on order. The ranking order may be set by type of industry, or by person or company. A higher rank transmitter may be assigned a bonus of a large banner on the WEB site. A transmitter can improve a corporate impression and obtain the prominence of the company name by obtaining a higher rank.

Not only a company, but also a person who is unsatisfied with a service or a product of a company, obtains a right to capture a vote to assert the option on the WEB. With a consent of voter, a higher rank can be achieved, and the assertion can be more prominent. Thus, an almost illegal corporate crime can be removed, and a conventionally taboo problem can be asserted. The prominence is enhanced with a larger number of supporters, thereby establishing a published opinion reporting system relating to politics.

Thus, both transmitter and receiver can enjoy the merit of using the third mail distribution service center, and the system that pleases both transmitter and receiver by participation can be provided. Using animation for the display contents on the WEB and voting for popularity, a ranking result can be obtained much more correctly than a TV rating check. A broadband can prove its worth, thereby realizing infinite number of channels. Only the third mail distribution service can be a TV program table.

In the above mentioned embodiments, the third mail distribution service center 30 is separate from the first and second mail distribution service center 10 and 20. However, the present invention is not limited to this concept, but the third mail distribution service center 30 can be combined with any of the first mail distribution service center 10 and the second mail distribution service center 20. That is, when the first mail distribution service center 10 is combined with the third mail distribution service center 30, electronic mail forwarded from the second mail distribution service center 20 is transmitted to the third mail distribution service center 30 where replacement means replaces a source, and it is transmitted with forwarding or without forwarding (that is, without changing the destination of electronic mail) to the first mail distribution service center 10 where it is processed by reception enable means. Otherwise, when the second mail distribution service center 20 is combined with the third mail distribution service center 30, the electronic mail received by the second mail distribution service center 20 is transmitted to the third mail distribution service center 30 with forwarding or without forwarding (that is without changing the destination of the electronic mail), the replacement means replaces the source, the mail is transmitted to the first mail distribution service center 10. Furthermore, electronic mail is forwarded from the third mail distribution service center 30 directly to mailbox 122 of the first mail distribution service center 10 in these embodiments. However, it can be forwarded indirectly, that is, from the third mail distribution service center 30 to a further mail distribution service center, and from the further mail distribution service center to the first mail distribution service center 10. Additionally, it can be forwarded from the second mail distribution service center 20 indirectly, that is, from the second mail distribution service center 20 to a further mail distribution service center, and from a further mail distribution service center to the third mail distribution service center 30.

As described above, according to the present invention, when junk mail transmitted from many and unspecified persons is sent to a first electronic mail address registered in the first mail distribution service center, the sources of the junk mail are not acceptable electronic mail addresses, and the reception enable means rejects receiving the junk mail, thereby avoiding transmission of the junk mail to subscribers. On the other hand, the electronic mail transmitted from many and unspecified persons and not to be rejected by the reception enable means is transmitted to a second electronic mail address. The electronic mail to the second electronic mail address received by the second mail distribution service center is forwarded to the third mail distribution service center (intermediate mail distribution service center), and the replacement means replaces the source with the acceptable electronic mail address registered in the first mail distribution service center, and the electronic mail is forwarded to the first mail distribution service center. Since the source is set to an acceptable electronic mail address, the reception enable means in the first mail distribution service center enables reception, and a subscriber can receive the electronic mail. Thus, the subscriber certainly receives the electronic mail whose source electronic mail address is not registered as acceptable electronic mail address, but which should be received by the subscriber when the electronic mail is transmitted from the source electronic mail address, thereby removing only junk mail.

What is claimed is:

1. A junk mail rejection system, comprising:
   a first mail distribution service center having a database in which a first electronic mail address of a subscriber is registered, receiving electronic mail transmitted to the first electronic mail address through a cable/wireless network, and transmitting the electronic mail to a terminal of the subscriber;
   a second mail distribution service center having a database in which a second electronic mail address of the subscriber is registered, and receiving electronic mail to the second electronic mail address through a cable/wireless network; and
   a third mail distribution service center having a database in which a third electronic mail address of the subscriber is registered, and receiving electronic mail to the third electronic mail address through a cable/wireless network,
   wherein said first mail distribution service center registers in the database one or more source electronic mail addresses as acceptable electronic mail addresses, associated with the first electronic mail address, from which electronic mail can be transmitted to a terminal of a subscriber among source electronic mail addresses of electronic mail addressed to the first electronic mail address, and comprises: reception means for receiving electronic mail to the first electronic mail address; reception enable means for determining whether or not a source electronic mail address of electronic mail received by said reception means is an acceptable electronic mail address registered in the database; and distribution means for transmitting the electronic mail to a terminal of a subscriber only the case when the reception enable means determines that it is an acceptable electronic mail address;
   said second mail distribution service center registers an electronic mail address of a transfer destination of a subscriber in the database associated with a second electronic mail address, and comprises reception means for receiving electronic mail to the second electronic mail address; and transfer means for forwarding the electronic mail received by said reception means to a third mail distribution service center directly through a cable/wireless network, or through another center; and
   said third mail distribution service center registers an electronic mail address of a transfer destination of a subscriber in the database associated with a third electronic mail address, and comprises reception means for receiving electronic mail to the third electronic mail address; replacement means for replacing a source electronic mail address of the electronic mail received by said reception means with one of the acceptable electronic mail addresses; and transfer means for forwarding the electronic mail whose source has been replaced by said replacement means to said first mail distribution service center directly through a cable/wireless network, or through another center.

2. The junk mail rejection system according to claim 1, wherein said second electronic mail address is registered as one of the acceptable electronic mail addresses registered in the database of the first mail distribution service center, and said replacement means of said third mail distribution service center replaces a source electronic mail address with the second electronic mail address.

3. The junk mail rejection system according to claim 2, wherein said replacement means replaces destination data of the electronic mail received by said reception means with the source data, and replaces the source data with the destination data.

4. The junk mail rejection system according to claim 2, wherein said replacement means adds the source data and/or destination data before replacement to information of a body of electronic mail.

5. The junk mail rejection system according to claim 1, wherein said third mail distribution service center further comprises mail reception amount restriction means for determining whether or not electronic mail received in a predetermined time period has exceeded a predetermined amount, and the electronic mail is rejected when the electronic mail has exceeded the predetermined amount.

6. The junk mail rejection system, according to claim 1, wherein said third mail distribution service center has a database storing for each subscriber an identification code indicating an attribute of a subscriber and an attribute of a transmitter whose electronic mail is permitted by the subscriber, and direct electronic mail transmission means for transmitting electronic mail to a specified mail address of a subscriber selected by the identification code.

7. The junk mail rejection system according to claim 6, wherein said direct electronic mail transmission means transmits electronic mail selected at random or intentionally as premier mail.

8. The junk mail rejection system according to claim 7, wherein said third mail distribution service center has a receiver rank database storing the number of pieces of obtained premier mail for each subscriber, and allows contents of the receiver rank database to be viewed on WEB as is or after being processed.

9. The junk mail rejection system according to claim 8, wherein said third mail distribution service center has a transmitter rank database storing the number of votes of subscribers who evaluate a transmitter for each transmitter of electronic mail transmitted by said direct electronic mail transmission means, and allows contents of the transmitter rank database to be viewed on WEB as is or after being processed.

10. An intermediate mail distribution service center, provided between
    a first mail distribution service center having a database in which a first electronic mail address of a subscriber is registered, receiving electronic mail transmitted to the first electronic mail address through a cable/wireless network, and transmitting the electronic mail to a terminal of the subscriber only when a source of the electronic mail has an acceptable electronic mail address permitted in advance for transmission to a terminal of the subscriber; and
    a second mail distribution service center having a database in which a second electronic mail address of the subscriber is registered, and receiving electronic mail to the second electronic mail address through a cable/wireless network, comprising:

reception means for receiving electronic mail to a second electronic mail address received by said second mail distribution service center;

replacement means for replacing a source of the electronic mail received by said reception means with the acceptable electronic mail address determined by said first mail distribution service center; and transfer means for allowing the electronic mail replaced by said replacement means to be transmitted to the first mail distribution service center.

11. The intermediate mail distribution service center according to claim 10, wherein one of the acceptable electronic mail addresses predetermined in said first mail distribution service center is the second electronic mail address, and said replacement means replaces a source with the second electronic mail address.

12. The intermediate mail distribution service center according to claim 11, wherein said replacement means replaces destination data of the electronic mail received by said reception means with the source data, and replaces the source data with the destination data.

13. The intermediate mail distribution service center according to claim 11, wherein said replacement means adds the source data and/or destination data before replacement to information of a body of electronic mail.

14. The intermediate mail distribution service center according to claim 10, comprising mail reception amount restriction means for determining whether or not electronic mail received in a predetermined time period has exceeded a predetermined amount, and the electronic mail is rejected when the electronic mail has exceeded the predetermined amount.

15. The intermediate mail distribution service center according to claim 10, further comprising direct electronic mail transmission means having a database storing for each subscriber an identification code indicating an attribute of a subscriber and an attribute of a transmitter whose electronic mail is permitted by the subscriber, and direct electronic mail transmission means for transmitting electronic mail to a specified mail address of a subscriber selected by the identification code.

16. The intermediate mail distribution service center according to claim 15, wherein said direct electronic mail transmission means transmits electronic mail selected at random or intentionally as premier mail.

17. The intermediate mail distribution service center according to claim 16, wherein said intermediate mail distribution service center has a receiver rank database storing the number of pieces of obtained premier mail for each subscriber, and allows contents of the receiver rank database to be viewed on WEB as is or after being processed.

18. The intermediate mail distribution service center according to claim 17, wherein the intermediate mail distribution service center has a transmitter rank database storing the number of votes of subscribers who evaluate a transmitter for each transmitter of electronic mail transmitted by said direct electronic mail transmission means, and contents of the transmitter rank database are viewed on WEB as are or after being processed.

* * * * *